US012775498B2

(12) United States Patent
Ramesh et al.

(10) Patent No.: US 12,775,498 B2
(45) Date of Patent: Oct. 27, 2026

(54) METHODS AND SYSTEMS FOR MULTI-OBJECTIVE WORKFLOW SCHEDULING TO SERVERLESS ARCHITECTURE IN A MULTI-CLOUD ENVIRONMENT

(71) Applicant: Tata Consultancy Services Limited, Mumbai (IN)

(72) Inventors: Manju Ramesh, Thane (IN); Dheeraj Chahal, Pune (IN); Chetan Dnyandeo Phalak, Mumbai (IN); Rekha Singhal, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 284 days.

(21) Appl. No.: 18/793,423

(22) Filed: Aug. 2, 2024

(65) Prior Publication Data

US 2025/0278303 A1 Sep. 4, 2025

(30) Foreign Application Priority Data

Aug. 30, 2023 (IN) ............................ 202321058297

(51) Int. Cl.
*G06F 3/00* (2006.01)
*G06F 9/50* (2006.01)

(52) U.S. Cl.
CPC ................................. *G06F 9/5027* (2013.01)

(58) Field of Classification Search
CPC ........................................................ G06F 9/54
See application file for complete search history.

(56) References Cited

U.S. PATENT DOCUMENTS

| | | | | |
|---|---|---|---|---|
| 6,353,924 B1 * | 3/2002 | Ayers | ................. | G06F 11/3466 714/E11.212 |
| 10,908,927 B1 * | 2/2021 | Harris | ................. | G06F 9/44573 |

(Continued)

FOREIGN PATENT DOCUMENTS

| | | |
|---|---|---|
| CN | 110851272 B | 2/2022 |
| WO | 2022267791 A1 | 12/2022 |

OTHER PUBLICATIONS

Xunyun Liu, Resource Management and Scheduling in Distributed Stream Processing Systems: A Taxonomy, Review, and Future Directions, (Year: 2020).*

(Continued)

*Primary Examiner* — Lechi Truong
(74) *Attorney, Agent, or Firm* — Finnegan, Henderson, Farabow, Garrett & Dunner, LLP

(57) ABSTRACT

The disclosure relates generally to methods and systems for multi-objective workflow scheduling to serverless architecture in a multi-cloud environment. Generating an optimal mapping scheme for heterogeneous tasks of the complex task workflow in the multi-cloud environment is always a challenge. The present disclosure make use of the serverless platforms in conjunction with the storage services for the optimal mapping of the task workflows to the multi-cloud environment using the particle swarm optimization (PSO) algorithm. In the present disclosure, each of the tasks of the application are characterized to determine one or more compute requirements, and one or more input/output (I/O) requirements. Furthermore, a compute capacity of each of the plurality of serverless computing instances, and bandwidth measurements are determined. Then, the optimized task workflow is generated, using the PSO technique by minimizing a multi-objective optimization function.

15 Claims, 10 Drawing Sheets

(56) References Cited

U.S. PATENT DOCUMENTS

| | | | | |
|---|---|---|---|---|
| 2012/0227053 | A1* | 9/2012 | Gargash | G06F 9/548 718/104 |
| 2012/0239812 | A1* | 9/2012 | Gargash | G06F 11/3051 709/226 |
| 2013/0283276 | A1* | 10/2013 | Vijayarajan | G06F 9/526 718/101 |
| 2018/0300173 | A1* | 10/2018 | Shimamura | G06F 9/5066 |
| 2019/0303018 | A1* | 10/2019 | Huang | G06F 3/0661 |
| 2021/0097030 | A1* | 4/2021 | Miller | G06F 16/183 |
| 2021/0097083 | A1* | 4/2021 | Harris | G06F 16/838 |
| 2022/0261278 | A1* | 8/2022 | Perneti | G06F 9/45558 |

OTHER PUBLICATIONS

Author: Haidong Zhao, Zakaria Benomar, Tobias Pfandzeltery, Nikolaos Georgantas Title: Supporting Multi-Cloud in Serverless Computing Date: 2023 Link: https://arxiv.org/pdf/2209.09367.

Author: Haiyang Hu, Zhongjin Li, Hua Hu [et. al] Title: Multi-Objective Scheduling for Scientific Workflow in Multicloud Environment Title of the item: Journal of Network and Computer Applications Date: 2018 vol. 114.

Author: Haiyang Hu, Zhongjin Li, Hua Hu [et. al] Title: Multi-Objective Scheduling for Scientific Workflow in Multicloud Environment Title of the item: American Scientific Research Journal for Engineering, Technology and Sciences Date: 2018 vol. 40; Issue: 1.

* cited by examiner

METHODS AND SYSTEMS FOR MULTI-OBJECTIVE WORKFLOW SCHEDULING TO SERVERLESS ARCHITECTURE IN A MULTI-CLOUD ENVIRONMENT

PRIORITY CLAIM

This U.S. patent application claims priority under 35 U.S.C. § 119 to: Indian Patent Application number 202321058297, filed on Aug. 30, 2023. The entire contents of the aforementioned application are incorporated herein by reference.

TECHNICAL FIELD

The disclosure herein generally relates to the field of multi-cloud environment, and more specifically to methods and systems for multi-objective workflow scheduling to serverless architecture in a multi-cloud environment.

BACKGROUND

Multi-cloud deployment is emerging as a preferred choice for the deployment of complex task workflows for price competitiveness and freedom from vendor lock-in. Typically, the complex task workflows consist of multiple tasks represented as a directed acyclic graph (DAG). Optimal deployment of such task workflows on a multi-cloud environment using multiple services requires a judicious selection to minimize an overall cost of deployment. However, finding an optimal mapping scheme for heterogeneous tasks of the complex task workflow in the multi-cloud environment is a challenge.

Furthermore, each participating cloud service provider (CSP) in the multi-cloud environment has a unique cost model and a maximum deliverable performance. Hence, exploration of the mapping scheme for the chosen service is always a technical challenge. Most conventional algorithms, frameworks, and tools that schedule complex tasks workflows on multi-cloud environments make use of virtual machines (VMs) available as Infrastructure-as-a-Service (IaaS). However, the use of scalable and cost-effective serverless platforms for scheduling complex task workflows in the multi-cloud environment is limited and inefficient in minimizing the overall cost of deployment.

SUMMARY

Embodiments of the present disclosure present technological improvements as solutions to one or more of the above-mentioned technical problems recognized by the inventors in conventional systems.

In an aspect, a processor-implemented method for multi-objective workflow scheduling to serverless architecture in a multi-cloud environment is provided. The method including the steps of: receiving a plurality of serverless computing instances and a plurality of storage services available in a plurality of cloud service providers of a multi-cloud serverless environment, wherein the plurality of serverless computing instances is of a heterogeneous configuration; receiving a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure; determining (i) one or more compute requirements, and (ii) one or more input/output (I/O) requirements required for each of the plurality of tasks present in the task workflow, based on the one or more dependencies among the plurality of tasks; determining (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generating an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

In another aspect, a system for multi-objective workflow scheduling to serverless architecture in a multi-cloud environment is provided. The system includes: a memory storing instructions; one or more Input/Output (I/O) interfaces; and one or more hardware processors coupled to the memory via the one or more I/O interfaces, wherein the one or more hardware processors are configured by the instructions to: receive a plurality of serverless computing instances and a plurality of storage services available in a plurality of cloud service providers of a multi-cloud serverless environment, wherein the plurality of serverless computing instances is of a heterogeneous configuration; receive a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure; determine (i) one or more compute requirements, and (ii) one or more input/output (I/O) requirements, required for each of the plurality of tasks present in the task workflow, based on the one or more dependencies among the plurality of tasks; determine (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generate an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

In yet another aspect, there are provided one or more non-transitory machine-readable information storage mediums comprising one or more instructions which when executed by one or more hardware processors cause: receiving a plurality of serverless computing instances and a plurality of storage services available in a plurality of cloud service providers of a multi-cloud serverless environment, wherein the plurality of serverless computing instances is of a heterogeneous configuration; receiving a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure; determining (i) one or more compute requirements, and (ii) one or more input/output (I/O) requirements, required for each of the plurality of tasks present in the task workflow, based on the one or more dependencies among the plurality of tasks; determining (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generating an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

In an embodiment, the one or more compute requirements required for each task in the task workflow is determined based on a number of million instructions (MI) present in an associated task and associated one or more dependencies, and the one or more I/O requirements required for each task in the task workflow is determined based on a number of I/O operations, a file size of the associated task and the associated one or more dependencies.

In an embodiment, generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising: (a) initializing each particle of the plurality of particles in an initial iteration, with random mappings using the PSO technique to obtain an initial position of each particle, wherein each particle in the random mappings represents a random mapping of each task of the plurality of tasks with the plurality of storage services and the plurality of serverless computing instances; (b) calculating a value of the multi-objective optimization function for each particle, based on (i) the initial position of an associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the initial iteration; (c) determining a local best of each particle, and a global best particle among the plurality of particles in the initial iteration, based on the value of the multi-objective optimization function for each particle; (d) calculating one or more rate parameters of the plurality of particles in the initial iteration using an adaptive rate technique, wherein the one or more rate parameters are an inertia weight, a local learning rate and a global learning rate; (e) moving each particle of the plurality of particles in a successive iteration, to obtain a next position of each particle, based on the initial position of each particle, the one or more rate parameters of the plurality of particles, the local best of each particle, and the global best particle among the plurality of particles in the initial iteration; (f) calculating the value of the multi-objective optimization function for each particle, based on (i) the next position of the associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the successive iteration; (g) determining the local best of each particle and the global best particle among the plurality of particles in the successive iteration, based on the value of the multi-objective optimization function for each particle in the successive iteration; (h) calculating the one or more rate parameters of the plurality of particles in the successive iteration using the adaptive rate technique, wherein the one or more rate parameters are the inertia weight, the local learning rate and the global learning rate; (i) repeating the steps (e) through (h) by considering the successive iteration as the initial iteration and the next position as the initial position, until one of (i) a predefined number of iterations are completed, and (ii) a global minimum of the multi-objective optimization function, is met, to obtain a final position of the global best particle; and (j) generating the optimal task workflow of the application for deployment in the multi-cloud serverless environment, based on the final position of the global best particle.

In an embodiment, generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising: perturbing each particle of the plurality of particles from an associated current position to the next position, if a change in the value of the multi-objective optimization function of the global best particle after a predefined number of iterations is less than a predefined threshold, and wherein a number of perturbations is less than a predefined perturbation threshold.

In an embodiment, the multi-objective optimization function is a weighted sum of a makespan and an execution cost of the task workflow of the application, wherein the makespan is defined as a total execution time of the task workflow, and the execution cost is defined as a total cost to execute the task workflow on the multi-cloud serverless environment based on a predefined cost model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
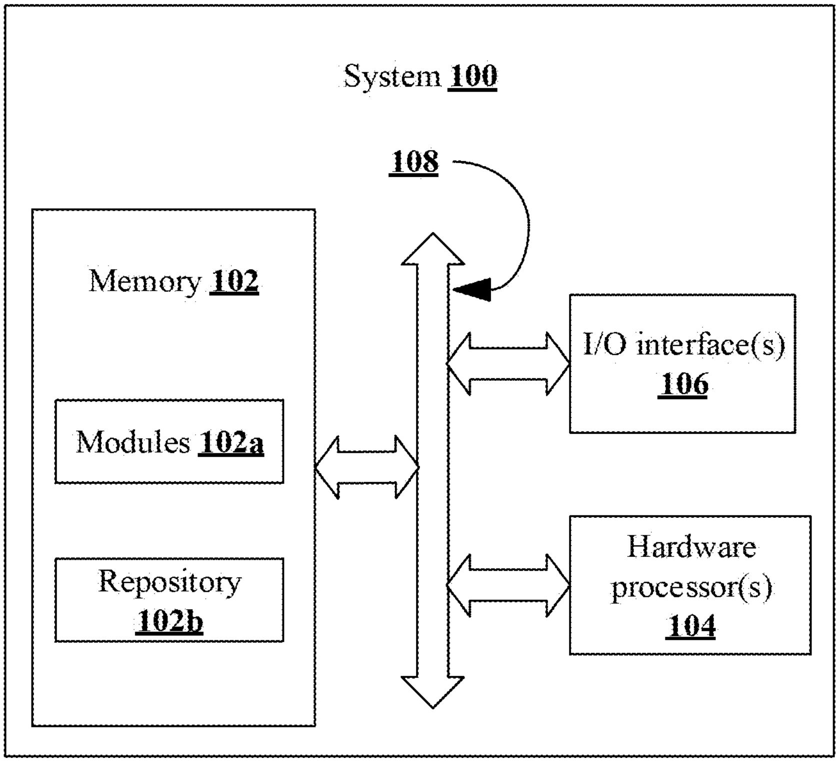
FIG. 1 is an exemplary block diagram of a system for multi-objective workflow scheduling to serverless architecture in a multi-cloud environment, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Many enterprises are adopting multi-cloud workload deployment strategies primarily to leverage vendor-specific capabilities of cloud services.

The other motivation for usage of a multi-cloud environment is to maximize performance, minimize the cost of deployment, and avoid vendor lock-in. Use of services from multiple clouds for computing, storage, and networking can result in more than 45% savings in the cost and 26% savings for the complex deployments involving databases and serverless services.

Workflow scheduling in the multi-cloud environment is a non-deterministic polynomial time hard (NP-hard) optimization problem.

Provisioning a workload consisting of a flow of multiple tasks across multiple clouds results in higher availability, improved fault tolerance, and freedom from vendor lock-in. However, uniqueness in multiple vendors' Cloud services, tools, and frameworks results in increased deployment complexity. Additionally, one of the deterrents to multi-cloud deployment is the complexity of the models for the cost estimation.

Cloud service providers (CSPs) provide compute services via Infrastructure-as-a-Service (IaaS) such as Amazon Web Services (AWS), Azure cloud services, Google Cloud Platform (GCP), etc. The virtual instances are billed for the duration they are acquired irrespective of whether they are idle or used. IaaS proves to be a good option for long running and consistent workloads. However, their use may not be cost-effective for bursty workloads and inconsistent resource demands. This is because over-provisioning results in idle resources while under-provisioning constitutes performance degradation.

One of the popular offerings from cloud vendors is Function-as-a-Service (FaaS) for the serverless deployment of workloads such as AWS Lambda, Azure functions, and GCP functions. FaaS is a highly scalable solution particularly useful for dynamically varying workloads. Unlike virtual machines (VMs) available as part of the IaaS offering on the cloud, users are billed based on the actual usage of the FaaS instances. Additionally, FaaS is highly scalable, and new instances can be spawned in a few milliseconds as and when a request for execution is generated. This characteristic is suitable for workflows represented as a direct acyclic graph (DAG) structure where the number of concurrent jobs change with time. Contrary to this, starting and stopping a new VM takes a few seconds. Hence, changes in the state of VMs with changing concurrent job number is costly and results in a higher latency. The pay-per-use cost model of the FaaS results in a cost-effective deployment of the workloads.

However, one of the drawbacks of the FaaS instances is statelessness. For any persistent storage requirements, users can avail of the cloud storage services such as AWS S3, Azure Blob Storage, GCP cloud storage etc. in conjunction with the FaaS. Additionally, a peer-to-peer communication is not possible in the FaaS. Hence, to communicate messages or data from one FaaS instance to another, a storage service or file system is used.

FaaS platforms can be exploited in the multi-cloud environment for deploying artificial intelligence (AI) workflows to achieve high-performance and cost-effective deployment. The optimal deployment of such workloads necessitates the use of cloud storage services for persistent storage. Also, it requires finding the optimal configuration of the computing instances for each individual task in the DAG to avoid over-provisioning or under-provisioning.

Very few techniques exist in the art for the optimal deployment of tasks in the DAG of complex workflows on serverless platforms in the multi-cloud environment. Furthermore, conventional techniques that proposes a methodology for deploying workflow tasks on the serverless platforms in conjunction with storage services from multiple clouds are very limited. Researchers have proposed frameworks and approaches to map complex workflows to VMs specifically in a single cloud. However, mapping such workflows to serverless platforms and cloud storage services in the multi-cloud environment offers unique challenges such as:

- The computing and storage in the serverless architecture are not co-located like VMs. Hence, the makespan of the workflow is significantly affected not only by the computing resources but also by the data transfer rate between instances and storage services of the multiple clouds. However, the cost model and service features such as network bandwidth, computing power, etc. vary significantly across multiple CSPs and are thus difficult to simulate.
- Finding the processing power of serverless instances is a challenge. For example, the CSPs do not provide million instructions per second (MIPS) that can be executed by the serverless instances for a given configuration.

The primary objective of the scheduling algorithm in the multi-cloud context is to find the most suitable service resource configuration which improves the quality of service (QOS) parameters such as makespan, execution time, reliability, etc. Researchers have presented various task scheduling algorithms specifically for the multi-cloud. Meta-heuristics algorithms such as Genetic Algorithm (GA), Ant Colony Optimization (ACO), Particle Swarm Optimization (PSO), etc., and their variants have been successfully used for finding optimal solutions for NP problems. Further, search-based methods for multi-cloud configuration are explored in the art. Many algorithms have been proposed for mapping complex workflows to the VMs available on the cloud as an IaaS offering.

The PSO based task scheduling has been proposed by many researchers in the art. The cost and makespan-aware scheduling of workflows using the IaaS has been proposed in the art. A Multi-objective optimization in the multi-cloud IaaS environment using a variant of PSO is also discussed in the art. A resource and deadline-aware scheduling using PSO is presented. The energy-aware task scheduling using the PSO algorithm for heterogeneous cloud is presented. A cloud task scheduling framework based on modified PSO for conflicting objectives is also proposed in the art. Most of these approaches either propose task scheduling solutions specific to IaaS or do not consider the multi-cloud and the multi-objective optimization of conflicting parameters such as time and cost.

Many meta-heuristic approaches have been proposed earlier such as GA, ACO, and PSO to solve task scheduling problems. However, PSO is the most popular of all due to ease of implementation, consistent performance, and robustness control parameters. The PSO generates a better schedule as compared to GA. The PSO algorithm suffers from the disadvantage that many times it converges fast to local minima. However, many improvements have been proposed lately to find a global minima in the art.

Deployment of deep learning models using a serverless platform has been presented in the art. However, these works are focused on studying the feasibility of a serverless platform for deep learning inference. A greedy algorithm-based approach for scheduling multi-function serverless applications on a hybrid cloud is also presented in the art. The use of a serverless platform for end-to-end machine-learning (ML) workflows has been presented using the cirrus framework. An in-depth investigation of the literature suggests that there are numerous variants of PSO for task scheduling on the cloud but most of these implementations are focused on mapping to VMs.

The present disclosure solves the technical problems in the art with the methods and systems for multi-objective workflow scheduling to serverless architecture in the multi-cloud environment. The methods and systems of the present disclosure make use of the adaptive rate particle swarm optimization (PSO) algorithm for searching the optimal configuration of the serverless computing instances such as FaaS instances to deploy task workflows such as Al task workflows. Further, the present disclosure makes use of the serverless platforms in conjunction with the storage services for the optimal mapping of the task workflows to the multi-cloud environment using the PSO. The mapping optimization of the present disclosure includes the overhead due to the use of cloud storage for persistent storage and communication between serverless instances running DAG tasks. The proposed disclosure is highly suitable for batch workflows where the number of concurrent jobs changes and hence resource requirements vary during the execution of the workload.

Referring now to the drawings, and more particularly to FIG. 1 through FIG. 7, where similar reference characters denote corresponding features consistently throughout the figures, there are shown preferred embodiments and these embodiments are described in the context of the following exemplary systems and/or methods.

FIG. 1 is an exemplary block diagram of a system 100 for multi-objective workflow scheduling to serverless architecture in a multi-cloud environment, in accordance with some embodiments of the present disclosure.

In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules **102*a* and a repository 102*b* for storing data processed, received, and generated by one or more of the plurality of modules 102*a*. The plurality of modules 102*a*** may include routines, programs, objects, components, data structures, and so on, which perform particular tasks or implement particular abstract data types.

The plurality of modules **102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100** and methods of the present disclosure.

The repository **102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102*b* may be distributed between the system 100** and the external database.

Figure 2:
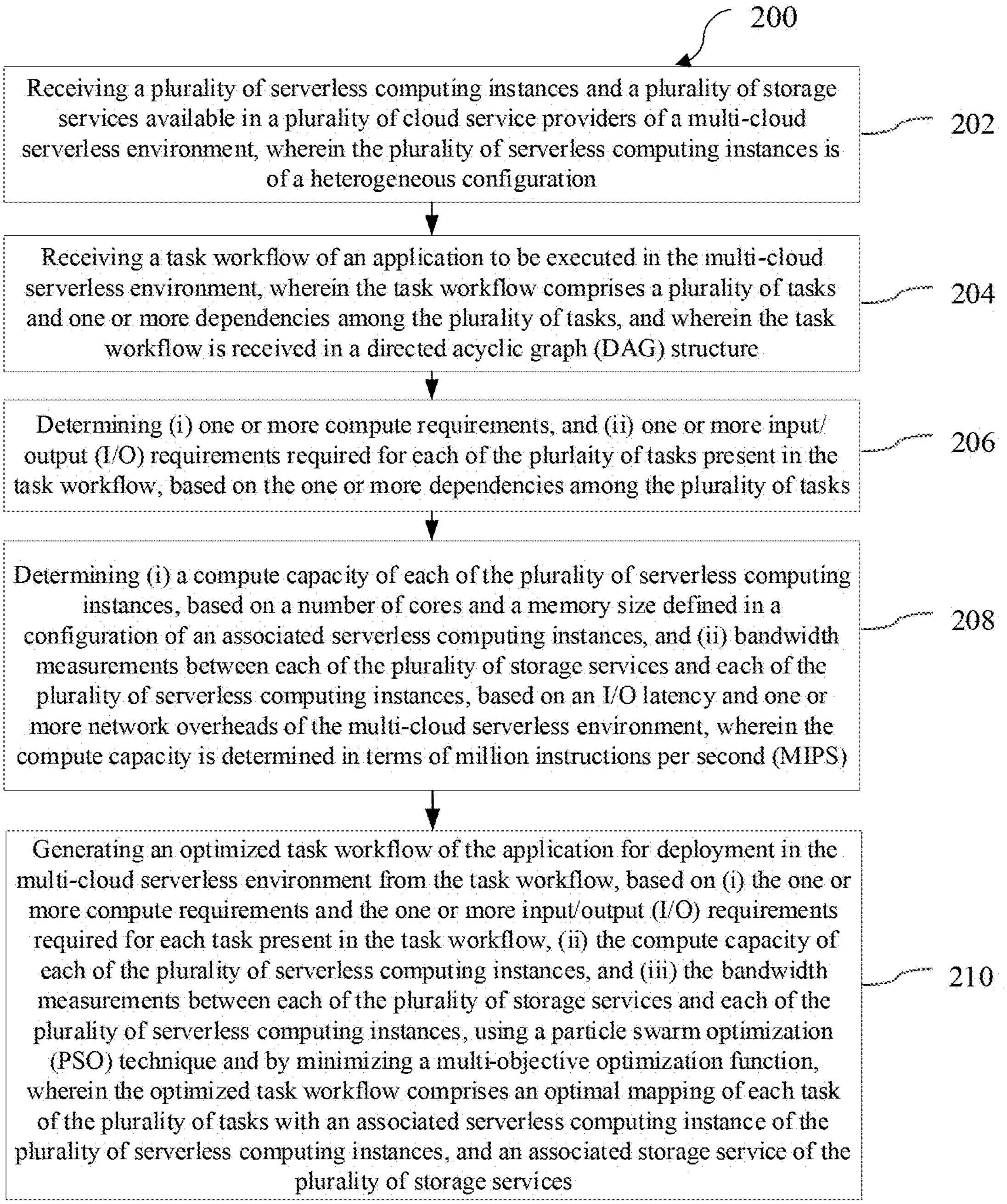
FIG. 2 illustrates exemplary flow diagram of a processor-implemented method for multi-objective workflow scheduling to serverless architecture in a multi-cloud environment, using the system of FIG. 1, in accordance with some embodiments of the present disclosure.

Referring to FIG. 2, components and functionalities of the system 100 are described in accordance with an example embodiment of the present disclosure. For example, FIG. 2 illustrates exemplary flow diagram of a processor-implemented method 200 for multi-objective workflow scheduling to serverless architecture in a multi-cloud environment, using the system 100 of FIG. 1, in accordance with some embodiments of the present disclosure. Although steps of the method 200 including process steps, method steps, techniques or the like may be described in a sequential order, such processes, methods, and techniques may be configured to work in alternate orders. In other words, any sequence or order of steps that may be described does not necessarily indicate a requirement that the steps be performed in that order.

The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of serverless computing instances and a plurality of storage services available in a plurality of cloud service providers of the multi-cloud serverless environment. The plurality of cloud service providers of the multi-cloud serverless environment include but are not limited to Amazon Web Services (AWS), Azure cloud services, and Google Cloud Platform (GCP).

In an embodiment, the plurality of serverless computing instances is of a heterogeneous configuration which mean the configuration of each serverless computing instance may differ from each other including but are not limited to number of central processing unit (CPU) cores, memory size, CPU clock frequency and so on. Though the present disclosure considers the heterogeneous configuration, the scope is not limited to a homogeneous configuration, the heterogeneous configuration, or a combination thereof.

At step 204 of the method 200, the one or more hardware processors 104 of the system 100 are configured to receive a task workflow of an application to be executed in the multi-cloud serverless environment. As explained above the task workflow is received in the directed acyclic graph (DAG) structure. The task workflow includes a plurality of tasks and one or more dependencies among the plurality of tasks. The one or more dependencies includes the dependencies of each task on the other tasks of the plurality of tasks. In an embodiment, some tasks may have dependencies on other tasks (referred as dependent tasks) while some other tasks may not have any dependencies at all (referred as independent tasks).

Figure 3:
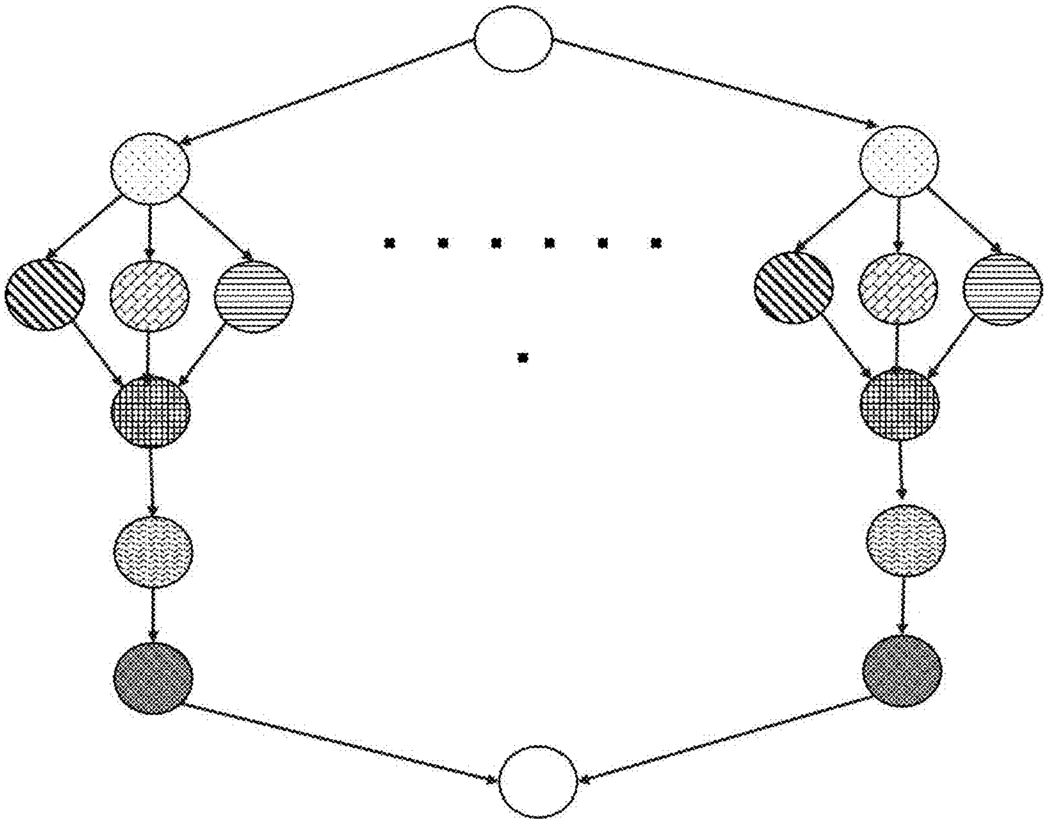
FIG. 3 illustrates an exemplary task workflow in a direct acyclic graph (DAG) structure to be deployed in a multi-cloud serverless environment, in accordance with some embodiments of the present disclosure.

FIG. 3 illustrates an exemplary task workflow in the direct acyclic graph (DAG) structure to be deployed in the multi-cloud serverless environment, in accordance with some embodiments of the present disclosure. As shown in FIG. 3, the exemplary task workflow consists of 50 tasks along with their priorities and dependencies.

At step 206 of the method 200, the one or more hardware processors 104 of the system 100 are configured to determine (i) one or more compute requirements and (ii) one or more input/output (I/O) requirements, required for each task present in the task workflow. The one or more compute requirements and the one or more input/output (I/O) requirements represent a set of standards to benchmark the tasks present in the task workflow based on their dependencies.

In an embodiment, the one or more compute requirements required for each task in the task workflow is determined based on a number of million instructions (MI) present in an associated task and associated dependent tasks (one or more dependencies) as received in the task workflow. In an embodiment, the one or more I/O requirements required for each task in the task workflow is determined based on a number of I/O operations present in the associated task, a file size of the associated task, and the associated dependent tasks (one or more dependencies).

At step 208 of the method 200, the one or more hardware processors 104 of the system 100 are configured to determine (i) a compute capacity of each of the plurality of serverless computing instances, and (ii) bandwidth measurements between each of the plurality of storage services and each of the plurality of serverless computing instances. The compute capacity and the bandwidth measurements represent the set of standards to benchmark (re-factoring) the serverless computing instances of the heterogeneous configuration and the storage services respectively.

In an embodiment, the compute capacity of each of the plurality of serverless computing instance is determined based on a number of cores and a memory size defined in a configuration of an associated serverless computing instances. In an embodiment, the bandwidth measurements between each of the plurality of storage services and each of the plurality of serverless computing instances, is determined based on an I/O latency and one or more network overheads of the multi-cloud serverless environment. In an embodiment, the compute capacity is determined in terms of million instructions per second (MIPS) to map with the number of million instructions (MI) present in the associated task.

At step 210 of the method 200, the one or more hardware processors 104 of the system 100 are configured to generate an optimized task workflow of the application for deployment in the multi-cloud serverless environment from the task workflow. The optimized task workflow includes an optimal mapping of each task of the plurality of tasks with an associated serverless computing instance of the plurality of serverless computing instances, and an associated storage service of the plurality of storage services. The optimized task workflow is deployed in the multi-cloud serverless environment to minimize the overall deployment cost.

The optimized task workflow is generated based on the benchmarking done at the earlier steps. More specifically, the optimized task workflow is generated based on (i) the one or more compute requirements and the one or more input/output (I/O) requirements required for each task present in the task workflow determined at step 206 of the method 200, (ii) the compute capacity of each of the plurality of serverless computing instances determined at step 208 of the method 200, and (iii) the bandwidth measurements between each of the plurality of storage services and each of the plurality of serverless computing instances determined at step 208 of the method 200.

An adaptive rate-based particle swarm optimization (PSO) technique is employed by minimizing a multi-objective optimization function, to generate the optimized task workflow. The multi-objective optimization function is defined as a weighted sum of a makespan and an execution cost of the task workflow of the application. The makespan is defined as a total execution time of the task workflow. The execution cost is defined as a total cost to execute the task workflow on the multi-cloud serverless environment based on a predefined cost model of the cloud service provider.

Let there be m cloud service providers (CSPs) in the multi-cloud environment denoted by $C=\{C_1, C_2, \ldots, C_m\}$. Let there be k serverless instances of heterogeneous configurations denoted by $I=\{I_1, I_2, \ldots, I_k\}$ and s storage services $S=\{S_1, S_2, \ldots, S_s\}$. available on these clouds. The DAG W (T, D) of a workflow consisting of n tasks is defined where T denotes a collection of tasks and D represents the dependency between these tasks. The objective of the present disclosure is to map the tasks in set T to the serverless instances by I and storage services S available with m CSPs and to minimize the multi-objective optimization function.

The multi-objective optimization function ($f(E_t, C)$) is mathematically represented as in equation 1:

$$f(E_t, C) = w_1 * E_t + w_2 * C \tag{1}$$

where functions $E_t$ and C represent the makespan of the task workflow and the cost of execution respectively. $w_1$ and $w_2$ are predefined weights based on individual function relevance. The objective functions are normalized and weights $w_1$ and $w_2$ are chosen such that their sum is 1. The Quality of Service (QoS) is measured as the deadline of execution and the budget is used as a constraint.

Makespan ($E_t$) computation: Unlike IaaS, FaaS is stateless and any data transfer between two functions takes place using communication channels such as object storage, file systems, databases, etc. The execution time due to each task in the DAG is due to multiple factors as stated below in equation 2:

$$T_i = T_{end,j} + T_{trans} + T_{comp} \tag{2}$$

Where $T_{end,j}$ represents the end time of the previous task. $T_{trans}$ is the network and storage service latency while $T_{comp}$ is the actual computation time of the task.

In the multi-cloud environment, data can be stored in any of the participating clouds and their services. The upload and download bandwidth provided by these clouds also varies. Moreover, the storage service characteristics of these clouds also vary which results in different data retrieval and storage time. The transmission time $T_{trans}$ of the data from task j to a storage device on cloud m and back to serverless function can be represented as in equation 3:

$$T_{trans} = T_{j,m} + T_s + T_{m,i} \tag{3}$$

Where $T_{j,m}$ is a function of storage service upload latency which is dependent on the network bandwidth (B(j, m)) between the function and the storage service on the same or different cloud. Likewise, $T_{m,i}$ represents the time to load data in the function i which was saved by the previous function j in the storage service. $T_{m,i}$ is dependent on the bandwidth (B (m, i)) between the function and the storage service. Also, both $T_{j,m}$ and $T_{m,i}$ depend on Data D (j, i) transferred between functions and storage service.

$$T_{j,m} = D(j, i)/B(j, m)$$

$$T_{m,i} = D(j, i)/B(m, i)$$

The delay $T_s$ is due to the time spent on storing and saving within the cloud service. Using this, the makespan ($E_t$) is calculated as:

$$E_t = \max(T_{exit})$$

Here, $T_{exit}$ is the last job in the DAG.

Execution cost (C) computation: The total cost of executing the task k on an instance j is expressed as in equation 4:

$$C_{k,j} = C_e + C_n + C_s \tag{4}$$

Here $C_e$ represents the cost due to the total memory reserved for the serverless computing instance and the execution time of the function on that serverless computing instance. It varies across serverless instances from different CSPs. $C_s$ is the cost of storage service used to save the intermediate data generated by a serverless instance and consumed by another. Also, $C_n$ is the cost to transfer data from service A to service B and it depends on whether services are running in two regions or residing in the same region and zone.

Compute cost ($C_e$): The compute cost ($C_e$) is due to the execution time on the function and the configuration of the serverless instance. The cost for one invocation in a serverless function is:

$$C_e = E_{st} * M_{GB} * R_{mem}$$

where $E_{st}$ is the execution time of the function, $M_{GB}$ is the memory configuration and $R_{mem}$ is the billing rate per memory-time consumed.

Storage cost ($C_s$): The object storage cost $C_s$ defines the cost model of the various clouds and is proportional to the size of the data stored and operations performed (read, write, delete) on it. Also, the billing rate varies across the different CSPs.

$$C_{St\_i} = D_{St_i} * R_{St_i} + \sum_{q=1}^{op} \text{n\_st}_{q\_st\_i} * R_{q\_st\_i}$$

where $D_{st_i}$ denotes the total data size stored in cloud i, op is the different operations possible on storage service, $\text{n\_st}_{q\_st\_i}$ is the number of $q^{th}$ operations done on the storage service of the $i^{th}$ cloud. $R_{st_i}$ and $R_{q\_st\_i}$ represent the billing rate for data stored and operations performed in the storage service in cloud i.

Network cost ($C_n$): All outbound data transfers incur network charges. This includes data to other cloud providers, as well as to other regions of the same cloud provider. The total network cost ($C_n$) for $F_i$ functions is calculated as follows:

$$C_{Nw\_i} = \sum_{j=1}^{F_i} Q_{ij} * R_{Nw_i} \text{D\_Out}_{ij}$$

where $\text{D\_Out}_{ij}$ is the average data size transferred out by the $j^{th}$ function in the $i^{th}$ cloud. $Q_{ij}$ is the number of executions of the $j^{th}$ function in the $i^{th}$ cloud. $R_{Nw_i}$ denotes the billing rate per GB of data transfer.

Problem complexity: Let there be m CSPs available for mapping a workflow of n task to their serverless platforms. Each serverless platform has C possible configurations. Additionally, each task use S storage services provided by the multiple CSPs. Assumed that each workflow is executed with one storage service at a time, then the total possible mapping combinations are calculated using the equation 5:

$$N = (m * C)^n * S \tag{5}$$

For example, more than 14 million combinations are possible for mapping a workflow containing 7 tasks on 3 clouds using 3 configurations of serverless instances each and 3 storage services.

PSO is a well-known optimization technique in that which is a swarm intelligence-based approach that imitates the movement of a flock of birds. A particle represents a bird in the flock. A swarm population is represented by generations of multiple particles. Each generation has multiple particles. Every particle in the generation is represented with a position, velocity, global best (gBestP), and the local best (lBestP). The lBestP represents the best solution of the particle itself while gBestP is the best solution among all the particles.

Each particle in PSO is characterized by position P and velocity v in a D dimensional search space. The particle velocity v and position P get updated after each iteration. A particle moves towards the lBestP as well as gBestP. The velocity v of a particle i at t+1 time instant w.r.t. t time instant is given as follows:

$$v_i^{t+1} = W * v_i^t + rl_i * p_i * (lBestP_i - P_i^t) + rg_i * q_i * (gBestP_i - P_i^t) \tag{6}$$

where W denotes the inertia weight that controls the momentum of the particle. $rl_i$ and $rg_i$ are learning rates while $p_i$ and $q_i$ represent random values between 0 and 1. At the next iteration, the position P of each particle is updated as:

$$P_i^{t+1} = P_i^t + v_i^{t+1}$$

Figure 4A:
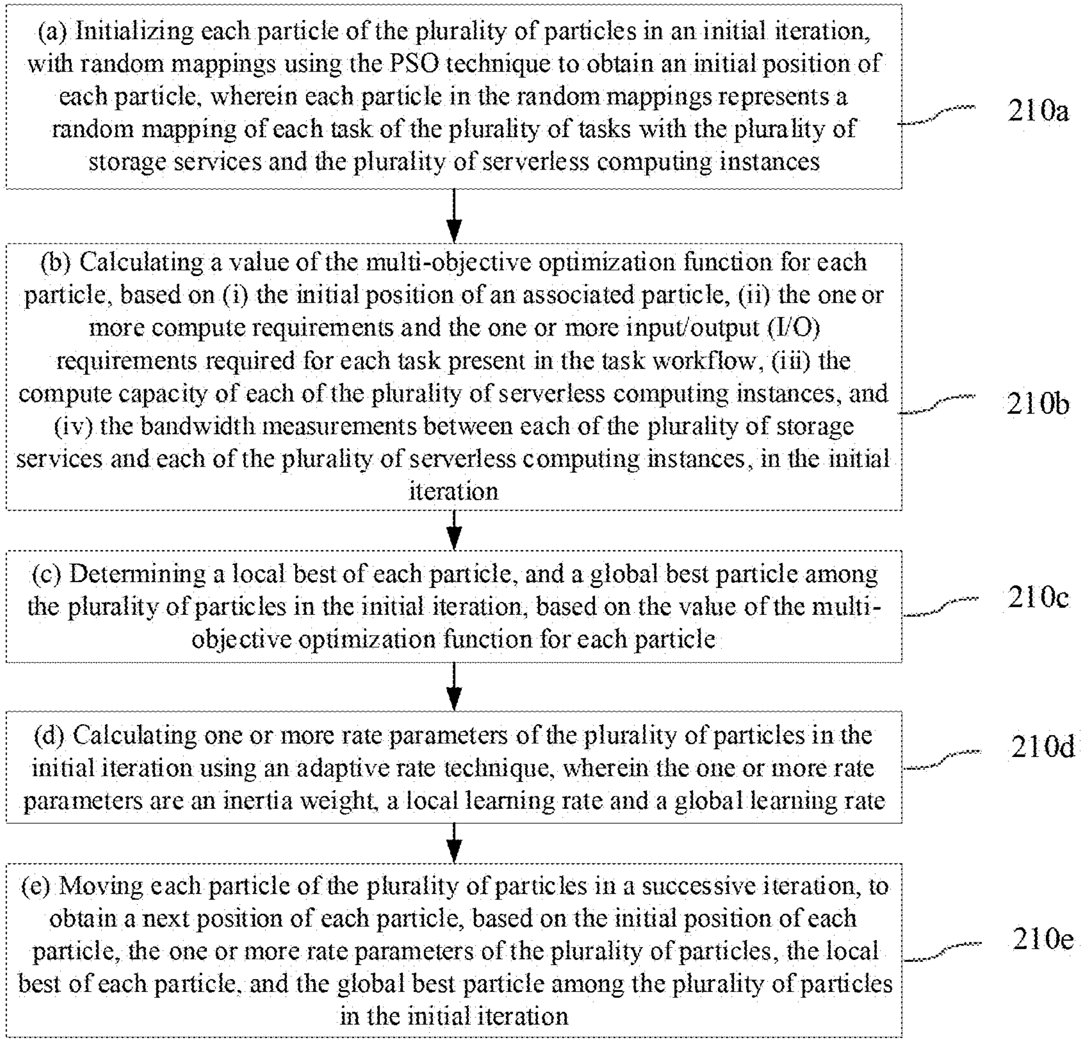
FIGS. 4A and 4B illustrates exemplary flow diagrams for generating an optimized task workflow of an application for deployment in a multi-cloud serverless environment from a task workflow, using the system of FIG. 1, in accordance with some embodiments of the present disclosure.
Figure 4B:
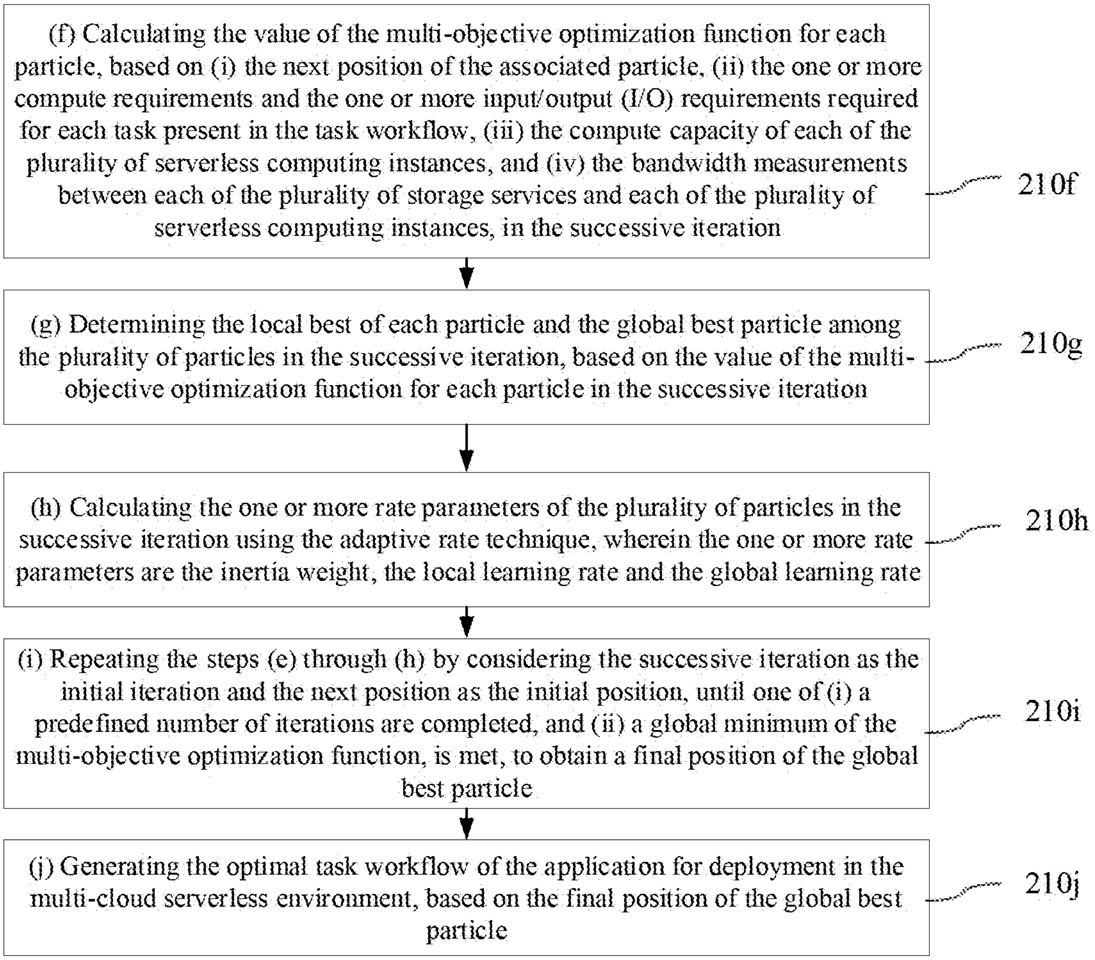

FIGS. 4A and 4B illustrates exemplary flow diagrams for generating an optimized task workflow of an application for deployment in a multi-cloud serverless environment from a task workflow, using the system 100 of FIG. 1, in accordance with some embodiments of the present disclosure. As shown in FIGS. 4A and 4B, generating the optimized task workflow of the application for deployment in the multi-cloud serverless environment from the task workflow is explained through steps 210*a* to 210*j*.

At step 210*a*, each particle of the plurality of particles are initialized in an initial iteration, with random mappings using the PSO technique. This initialization step results in obtaining an initial position of each particle. Each particle in the random mappings represents a random mapping of each task of the plurality of tasks with the plurality of storage services and the plurality of serverless computing instances.

At step 210*b*, a value of the multi-objective optimization function for each particle is calculated. The value of the multi-objective optimization function for each particle is calculated based on (i) the initial position of an associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the initial iteration.

At step 210*c*, a local best of each particle and a global best particle among the plurality of particles in the initial iteration, is determined based on the value of the multi-objective optimization function for each particle calculated at step 210*b*. The local best of each particle refers to the position of the associated particle at which the value of the multi-objective optimization function is minimum in the initial iteration. The global best particle is the particle having the least value of the multi-objective optimization function among the plurality of particles in the initial iteration. At step 210*d*, one or more rate parameters of the plurality of particles in the initial iteration is calculated using an adaptive rate technique. The one or more rate parameters are an inertia weight, a local learning rate and a global learning rate.

At step 210*e*, each particle of the plurality of particles is moved in a successive iteration, to obtain a next position of each particle. Each particle is moved based on the initial position of each particle, the one or more rate parameters of the plurality of particles determined at step 210*d*, the local best of each particle, and the global best particle among the plurality of particles in the initial iteration determined at step 210*c*.

At step 210*f*, the value of the multi-objective optimization function for each particle is calculated in the successive iteration. The value of the multi-objective optimization function for each particle is calculated based on (i) the next position of the associated particle obtained at step 210*e*, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances.

At step 210*g*, the local best of each particle and the global best particle among the plurality of particles in the successive iteration, are determined based on the value of the multi-objective optimization function for each particle in the successive iteration. The local best of each particle refers to the position of the associated particle at which the value of the multi-objective optimization function is minimum after the successive iteration. The global best particle is the particle having the least value of the multi-objective optimization function among the plurality of particles after the successive iteration.

At step 210*h*, the one or more rate parameters of the plurality of particles are then calculated in the successive iteration using the adaptive rate technique. The one or more rate parameters are the inertia weight, the local learning rate and the global learning rate.

At step 210*i*, the steps 210*e* through 210*h* are repeated by considering the successive iteration as the initial iteration and the next position as the initial position. The repletion is continued until either a predefined number of iterations are completed, or a global minimum of the multi-objective optimization function is met. After this convergence, a final position of the global best particle is obtained.

At step 210*j*, the optimal task workflow of the application for deployment in the multi-cloud serverless environment, is generated based on the final position of the global best particle. Using the final position of the global best particle, the optimal mapping of each task of the plurality of tasks with the associated serverless computing instance of the plurality of serverless computing instances, and the associated storage service of the plurality of storage services, is obtained to generate the optimal task workflow.

Further, during the generation of the optimal task workflow, if a change in the value of the multi-objective optimization function of the global best particle after a predefined number of iterations is less than a predefined threshold, then each particle of the plurality of particles are perturbated such that each particle moves from an associated current position to the next position.

Perturbation in PSO: One of the well-known challenges in the PSO algorithm is to distinguish between local and global minima when it shows minor or no improvements in the multi-objective optimization function (generally called as fitness function in the PSO) for the adjacent iterations. Many strategies have been proposed in the art to overcome this limitation. One solution is to use perturbation of particles when no improvement is observed in the global best for a certain number of iterations. The perturbation approach involves changing the learning rates $rl_i$ and $rg_i$ called cognition and social parameters. This procedure is repeated twice assuming that it is sufficient for the particles to escape local minima and attain the global maximum. Before applying the perturbation, the current global and local best is also saved in case global minima has already been reached.

Adaptive learning rates: In the PSO, the optimal solution is reached by balancing both local and global searches, for which the learning rates play a major role. It needs to be tuned optimally for balanced exploration and exploitation. The optimization of learning rates has been studied extensively by researchers and many approaches are suggested. In the present disclosure, the local ($rl_i(t)$) and the global learning rates ($rg_i(t)$) for each iteration t are defined as:

$$rl_i(t) = rl_{min} - rl_{max}\frac{t}{N} + rl_{max}$$

$$rg_i(t) = rg_{max} - rg_{min}\frac{t}{N} + rg_{min}$$

wherein N is the maximum number of iterations for which the PSO algorithm is executed. The $rl_{min}$ and $rl_{max}$ are the min and max values for the local learning rates. Similarly, the $rg_{max}$ and $rg_{min}$ are the min and max values for the global learning rates.

Adaptive Inertia weights: The inertia weight is another important parameter for maintaining a balance between local and global search. Many strategies such as Simple Random Inertia Weight (SIRW), Chaotic Inertia Weight (CIW), Chaotic Descending Inertia Weight (CDIW) etc. have been proposed by researchers in the art for selecting inertia weight values. In the present disclosure, the CDIW approach is where inertia weight is calculated as follows:

$$W(t) = (x_1 - x_2) \times \left(\frac{N - t}{N}\right) + (x_2 \times z)$$

where $x_1$ and $x_2$ represent initial (max) and final (min) inertia weights while z is a random value chosen between 0 and 1. N represents the maximum iterations and t is the current iteration.

Implementation details of the PSO algorithm in the present disclosure is explained in the below pseudo code:

Input: Set of tasks in DAG, their compute requirement (in MI) and Input/output data sizes, Set of serverless instances with their configuration (MIPS), bandwidth details (MB/s) and the cost model.

Output: Optimal mapping of tasks in the DAG to serverless computing instances

1. No of particles=100, N=350, $rl_{min}=rg_{min}=0.5$, $rl_{max}=rg_{max}=1.5$, $x_1=0.9$, $x_2=0.4$
2. while t<N do
3. Find inertia weight W using $x_1$ and $x_2$
4. Find local and global learning rates $rl_i$ and $gl_i$
5. for Each particle i do
6. Update the velocity of the particle
7. Update the position of the particle
8. Evaluate the fitness of the particle at the current position ($current_{pos}$).

$$F_c = w_1 * E_t + w_2 * C$$

9. The best fitness for a particle and the global best fitness is evaluated and their corresponding positions are noted as follows:

```
/* Update personal best as */
10. if Fc(current_pos) < if Fc(lBestP) then
11. lBestP ← current_pos
12. end
13. /* Update global best as */
14. if Fc(current_pos) < if Fc(gBestP) then
15. gBestP ← current_pos
16. end
17. end
18. /* Check for stalls in global best fitness and introduce perturbation */
19. if (Stalls == 10 & Perturbations < 2) then
20. perturb particles and increment perturbation number
21. end
22.   t++
23. end
```

Figure 5:
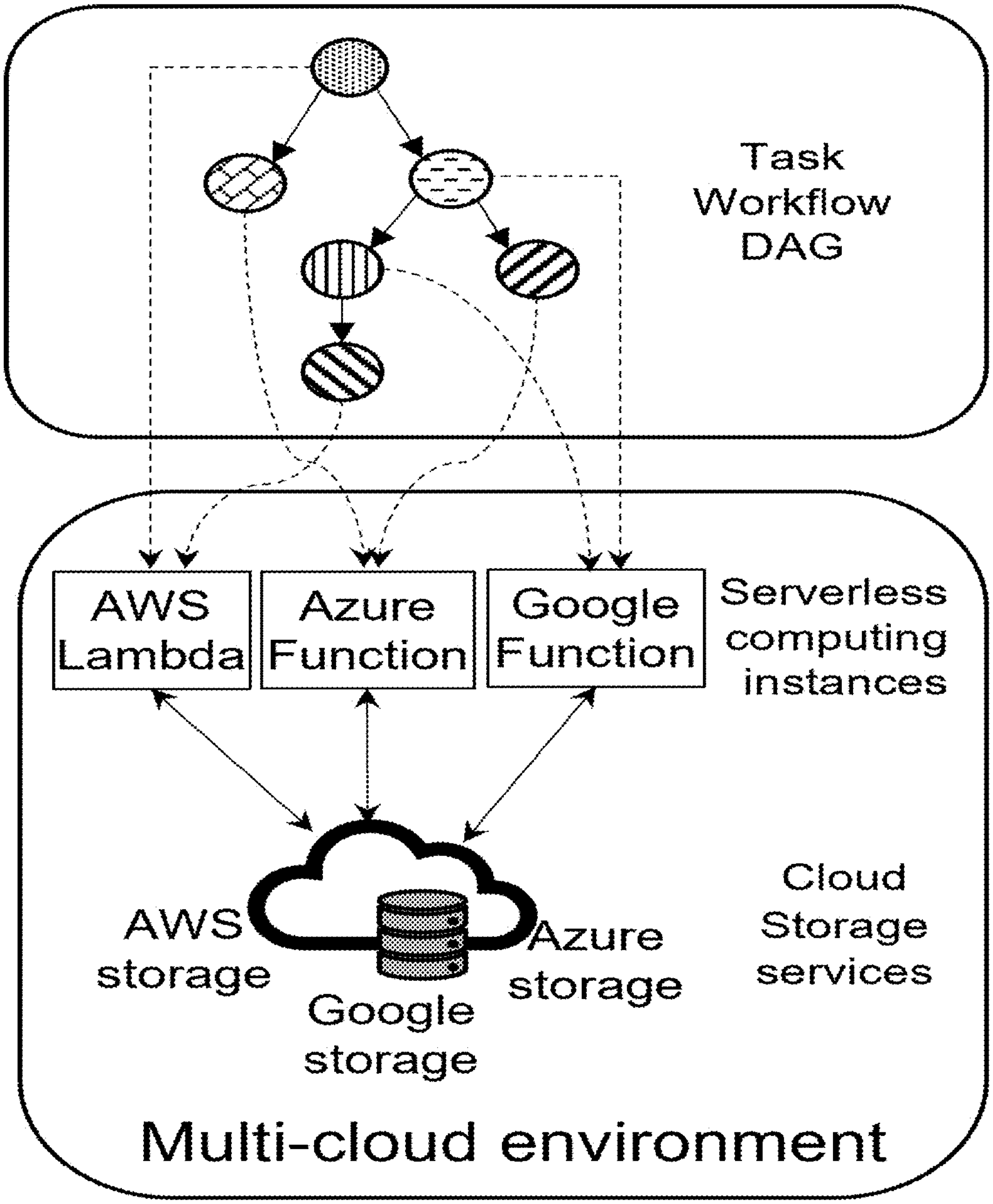
FIG. 5 illustrates an exemplary multi-cloud serverless environment along with an optimal mapping of a task workflow, in accordance with some embodiments of the present disclosure.

FIG. 5 illustrates an exemplary multi-cloud serverless environment along with an optimal mapping of the task workflow, in accordance with some embodiments of the present disclosure. As shown in FIG. 5, the workflow in the DAG format is mapped to the serverless computing instances of the cloud service providers (CSPs) of AWS Lambda, Azure functions, and GCP functions, along with storage services present in the exemplary multi-cloud serverless environment.

The method and systems of the present disclosure make use of the serverless platforms in conjunction with the storage services for the optimal mapping of the task workflows to the multi-cloud environment using the PSO. The mapping optimization of the present disclosure includes the overhead due to the use of cloud storage for persistent storage and communication between serverless instances running DAG tasks. The proposed disclosure is highly suitable for batch workflows where the number of concurrent jobs changes and hence resource requirements vary during the execution of the workload.

FaaS and communication channel simulation: CloudSim is a popular simulation tool used for simulating workloads on cloud VMs. It is primarily for simulating clusters of VMs. Multiple enhancements are made to the Workflowsim2version of CloudSim to support the simulation of FaaS instances as serverless computing instances, and storage services. Specifically, the following major changes are committed to the CloudSim:

A new FaaS class is introduced in the compute resources that consider actual cloud configurations and cost models.

The CloudSim classes are modified to handle the data transfer and consider cloud-specific FaaS to storage service network bandwidth.

PSO algorithm with perturbation and adaptive rates is implemented as a Planner algorithm in WorkflowSim. This uses the makespan and cost computation models.

The CloudSim represents compute resources (serverless computing instances) processing power in terms of Million Instructions Per Second (MIPS). However, finding MIPS of the serverless function is a challenging task as the user has limited access to the hardware of serverless cloud functions. A perf stat tool was used to find the number of instructions in a few compute and memory-intensive jobs. Matrix multiplication and exponential calculation jobs are executed on different FaaS configurations and noted the execution time $T_f$. Jobs of different characteristics are used for characterizing the serverless computing instances. Let the number of million instructions of the job be $J_{mi}$ (as estimated using perf stat). The MIPS of the FaaS instance $F_{mips}$ is calculated as follows:

$$F_{mips} = J_{mi}/T_f$$

While finding the execution time on the function on the serverless computing instance, the function is refactored such that only compute time is included in the $E_t$.

As described earlier, FaaS instances are stateless and hence communicate through the cloud service such as block storage. Hence, benchmarking exercise to find the network bandwidth supported between serverless instances and storage services of various CSPs as shown in Table 1. The network bandwidth is used as input to the CloudSim for simulation. To account for the network latency variations, the bandwidth is considered as a normal distribution with mean values as given in the Table 1 for each serverless and storage service combination.

TABLE 1

| Cloud (Memory in GBs) | Upload bandwidth (BW) (MB/s) | | | Download bandwidth (BW) (MB/s) | | |
|---|---|---|---|---|---|---|
| | S3 | GCP | AZRS | S3 | GCP | AZRS |
| AWS (1) | 37 | 35 | 31 | 47 | 42 | 33 |
| AWS (2) | 35 | 34 | 31 | 55 | 58 | 33 |
| AWS (4) | 32 | 34 | 29 | 45 | 44 | 37 |
| AWS (8) | 30 | 35 | 30 | 49 | 45 | 32 |
| GCP (1) | 19 | 21 | 18 | 26 | 16 | 18 |
| GCP (2) | 26 | 28 | 19 | 41 | 29 | 26 |
| GCP (4) | 29 | 28 | 24 | 46 | 35 | 25 |

TABLE 1-continued

| Cloud (Memory in GBs) | Upload bandwidth (BW) (MB/s) | | | Download bandwidth (BW) (MB/s) | | |
|---|---|---|---|---|---|---|
| | S3 | GCP | AZRS | S3 | GCP | AZRS |
| GCP (8) | 30 | 31 | 27 | 52 | 41 | 27 |
| AZR (1.5) | 27 | 34 | 29 | 41 | 20 | 24 |

Use cases of the systems and methods of the present disclosure: Two deep learning applications are chosen to validate the present disclosure for optimal deployment of workloads using serverless instances and storage services on the multi-cloud environment. The two deep learning applications are Deep Reader Application and Digital Drawing Application.

Deep Reader Application: Deep Reader is a document processing application of the applicant, consisting of more than thirty deep learning models for extracting information from a given pdf or text document. The information to be extracted includes objects and entities in the document such as addresses, logos, tables, signatures, etc. These models are embedded inside application programming interfaces (APIs). These APIs have dependencies such that the output produced from one API may be consumed by another API. The APIs of the Deep Reader are deployed as a function on a cloud and the data communication between them is facilitated using the cloud storage service. The APIs in the Deep Reader application have unique compute and data transfer requirements and hence a natural use case for evaluating our mapping optimization study. The DAG in this case consists of 42 unique tasks such that each task is executed on one serverless instance.

Digital Drawing Application: Digital Drawing application is also the deep learning application of the applicant for extracting information from equipment and process flow using Piping and Instrumentation diagrams (P&ID). Eventually, the Digital Drawing application automatically digitizes the P&ID applications. Similar to the Deep Reader application, the Digital drawing application consists of multiple models as part of multiple APIs that are suitable for deployment as cloud functions. The communication between these APIs takes place through object storage services. The DAG of the Digital Drawings in this case consists of 50 tasks. The exemplary DAG shown in FIG. 3 is the DAG of the Digital Drawing Application.

Example scenario: In the experimental setup, the offline characterization of workflow for finding the compute and storage requirements was performed in a lab environment using Intel Xeon servers with 28 cores. A modified CloudSim (version 3.0.3) simulator was used to simulate serverless instances with the configuration required for executing various jobs based on the characterization data. The minimum configuration selected for a FaaS function is 1 GB and incremented in steps of 1 GB. The maximum configuration is 8 GB. All experiments on cloud are performed in asia-south (Mumbai) region and the cost is measured in the USD ($). The object storage and serverless platforms are initialized in the Mumbai region only. Each experiment with real cloud instances is repeated at least thrice.

In the simulation, for each particle representing the DAG, tasks are mapped to a mix of instances from serverless platforms across clouds. Particles are initialized with the configurations of instances from AWS, GCP, and Azure cloud. Table 2 shows an exemplary initialization of each particle for deep reader application. All 42 tasks are mapped to the serverless instances of AWS, Azure services (AZR), and GCP cloud. One storage service is selected for all the tasks of each particle.

TABLE 2

| Particles | Serverless computing instance (Memory in GB) | | | | | | | | |
|---|---|---|---|---|---|---|---|---|---|
| | 0 | 1 | 2 | 3 | 4 | . . . | 40 | 41 | Storage |
| P1 | AWS (4) | AWS (4) | GCP (2) | AWS (4) | GCP (2) | . . . | AZR (1) | GCP (8) | AZR |
| P2 | AWS (4) | GCP (8) | AWS (1) | GCP (4) | AWS (4) | . . . | AWS (4) | GCP (1) | AWS |
| P99 | AWS (2) | AWS (8) | AWS (8) | GCP (2) | AWS (4) | . . . | AWS (2) | AWS (1) | AWS |
| P100 | GCP (1) | AWS (2) | AWS (8) | GCP (1) | AWS (1) | . . . | AZR (1) | GCP (4) | AWS |

As the simulation progresses, particles converged, and the workflow is mapped to a mix of instances from participating clouds to obtain the optimal task workflow. Table 3 shows the convergence of particles as the simulation progresses from first to 350th iteration. All 42 tasks are mapped to the optimal cloud instance and configuration along with the storage service at the end of the simulation, particle 37 (p37) was the global best particle.

TABLE 3

| Iterations | Particles | Serverless computing instance (Memory in GB) | | | | | | | | | |
|---|---|---|---|---|---|---|---|---|---|---|---|
| | | 0 | 1 | 2 | 3 | 4 | 5 | . . . | 40 | 41 | Storage |
| 1 | P1 | AWS (4) | AWS (4) | GCP(2) | AWS (4) | GCP(2) | AWS (4) | . . . | AZR(1) | GCP(8) | AZR |
| | P37 | AWS(8) | GCP(1) | AWS (4) | AWS (8) | AZR (1) | GCP(8) | . . . | AWS (8) | GCP(2) | AZR |
| | P100 | GCP(1) | AWS (2) | AWS (8) | GCP(1) | AWS (1) | GCP(1) | . . . | AZR(1) | GCP(4) | AWS |
| 200 | P1 | GCP(8) | AWS (8) | GCP(8) | GCP(8) | GCP(8) | AWS (1) | . . . | AZR(1) | AWS (8) | GCP |
| | P37 | GCP(8) | AWS (8) | GCP(8) | GCP(8) | GCP(8) | AWS (1) | . . . | AZR(1) | AWS (8) | GCP |
| | P100 | GCP(8) | AWS (8) | GCP(8) | GCP(8) | GCP(8) | AWS (1) | . . . | AZR(1) | AWS (8) | GCP |
| 350 | P1 | GCP(8) | AWS (8) | GCP(8) | GCP(8) | GCP(8) | AZR (1) | . . . | AZR(1) | AWS (8) | GCP |
| | P37 | GCP(8) | AWS (8) | GCP(8) | GCP(8) | GCP(8) | AZR (1) | . . . | AZR(1) | AWS (8) | GCP |
| | P100 | GCP(8) | AWS (8) | GCP(8) | GCP(8) | GCP(8) | AZR (1) | . . . | AZR(1) | AWS (8) | GCP |

Experimental results: A simulation of the workflow was conducted using the modified CloudSim simulator and possible configurations of the resources Additionally, the simulation results are compared with the actual deployment on the multi-cloud environment.

Objective function convergence using simulator: The convergence of objective function was observed as the simulation progresses from iteration 1 to 350 for the Digital Drawings and the Deep Reader applications. The generation of 100 particles converges successfully except for a few particles in both cases. In both cases, particles are initialized with random configurations of the instances chosen from a pool of possible configurations on different clouds. At the end of the simulation, the workflow mapping of most of the particles was observed as the same, hence they are converging.

Makespan and cost function evaluation: The weighted sum approach was employed to evaluate the multi-objective optimization function. In this experiment, the effect of weights assigned to makespan and cost functions while calculating the multi-objective optimization function was studied. The value of these weights is defined by the user based on the objective. For example, higher weightage is assigned to the cost function if budget is a constraint or higher weightage is assigned to makespan if latency needs to be minimized.

Figure 6:
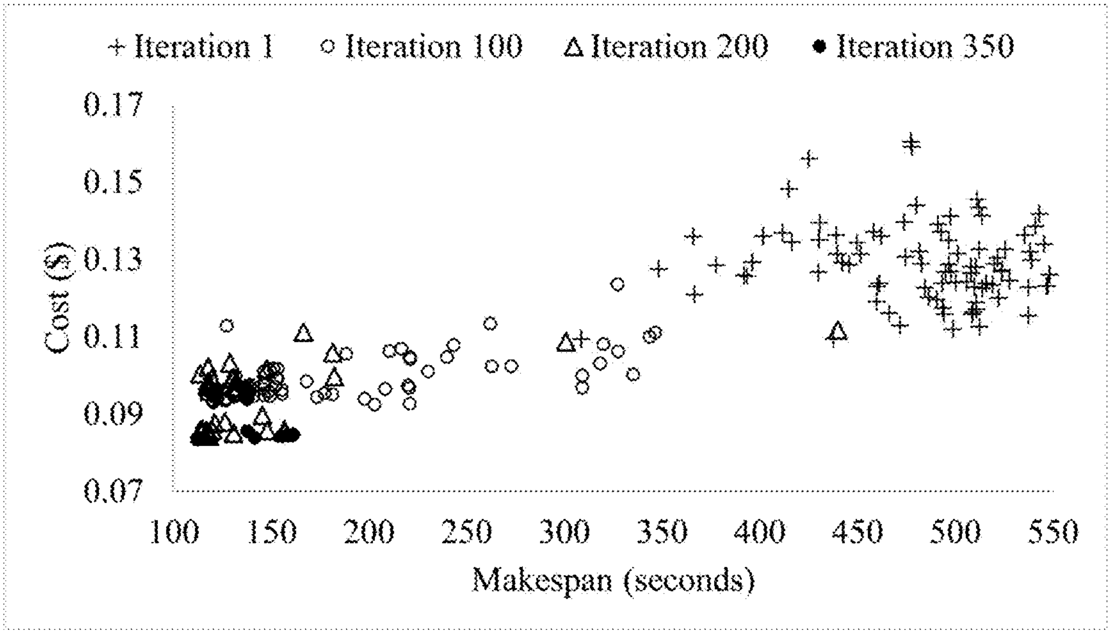
FIG. 6 is a graph showing the convergence of the makespan and the execution cost function of the different particle positions for Digital Drawing application, in accordance with some embodiments of the present disclosure.
Figure 7:
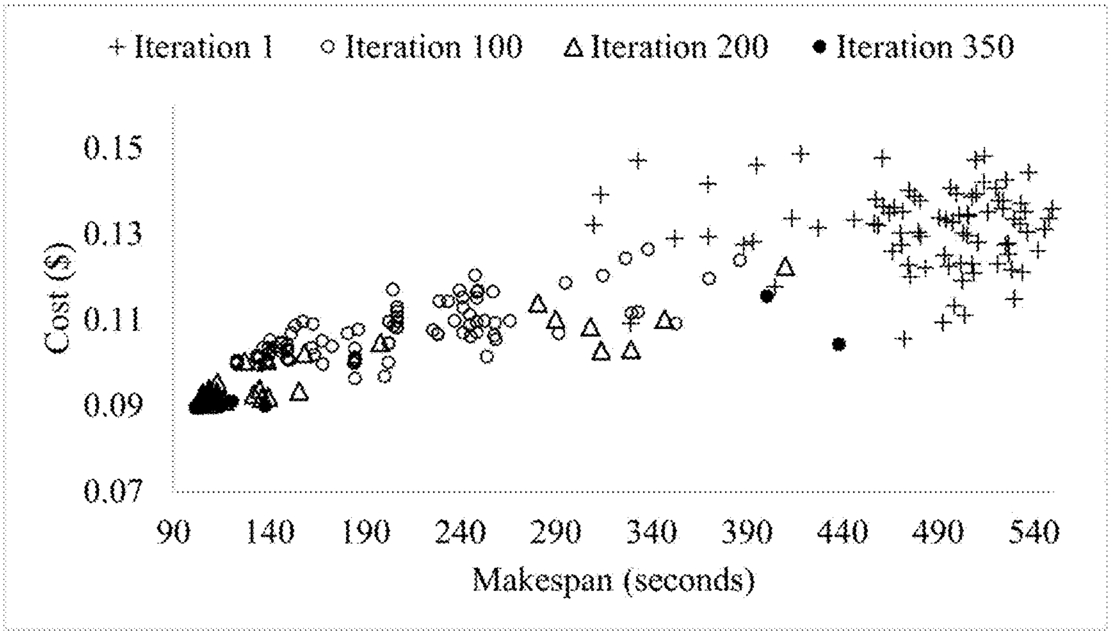
FIG. 7 is a graph showing the makespan and the execution cost for the different particle positions of the swarm at the end of 1, 100, 200, 350 iterations for the Digital Drawing application with the weightage of 0.9 and 0.1 for the makespan and the execution cost respectively, in accordance with some embodiments of the present disclosure.

1. Equal weights for both the functions: FIG. 6 is a graph showing the convergence of the makespan and the execution cost of the different particle positions for Digital Drawing application, in accordance with some embodiments of the present disclosure. In this $w_1$=W2=0.5 for both applications. Both the makespan and the execution cost show equally the good performance.
2. Different weights for both the functions: The optimal solution for mapping measured in terms of objective function varies when the weightage for makespan and execution cost changes in the multi-objective optimization function. If higher weightage was given for the makespan ($w_1$=0.9 and $w_2$=0.1) and then, it was observed that the makespan is reduced at an increased cost when compared with equal weightage for both makespan and cost. FIG. 7 is a graph showing the makespan and execution cost for the different particle positions of the swarm at the end of 1, 100, 200, 350 iterations for the Digital Drawing application with the weightage of 0.9 and 0.1 for the makespan and the execution cost respectively, in accordance with some embodiments of the present disclosure. Similarly, when the execution cost is given higher weightage, the optimal solution was obtained with a reduced cost at a higher makespan. A similar trend is observed for the Deep Reader application when the weightage for makespan is higher than that of cost. the reduced makespan was seen when compared to equal weightage. When cost is given a higher weightage, the reduced execution cost was seen. The change in makespan and cost values with changing weights is due to the change in the configurations of the instances to which tasks of a particle are mapped.
3. Effect of perturbation: The evolution of the global best value (gBestP) for the Digital Drawings workflow and Deep Reader workflow was studied. When the gBestP value stalls i.e., the change in fitness value (the value of the multi-objective optimization function) is below a threshold, for 10 iterations, the particles are perturbed by changing the learning rates of the particles. The learning rates are set to 4 for the first perturbation and 3 for the subsequent perturbations. However, for all other iterations, learning rates are smaller (between 0.5 and 2.5 only).
4. Evaluation of optimal schedule on the multi-cloud: The mapping generated was evaluated using the simulator by deploying on real cloud instances. Three cases were considered; a) Non-optimized: A mapping that we use to initialize the simulator at the beginning of the simulations. The configuration of a particle was considered from the center of the cluster of 100 initialized particle configurations used for the first iteration; b) Intermediate: Mapping of a particle after completion of 100 iterations of the simulation c) Optimal: Mapping generated when all the particles converge after 350 iterations.

Figure 8:
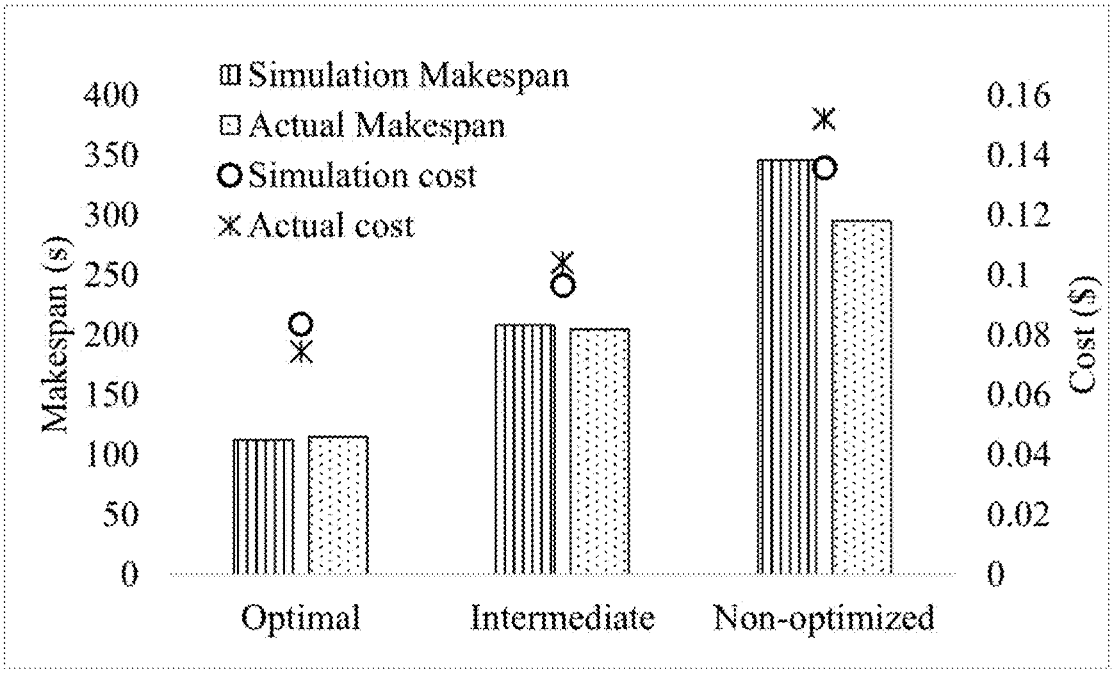
FIG. 8 is a graph showing the makespan and the execution cost comparison of mapping generated using simulation and its execution on actual cloud instances for the Digital Drawing application, in accordance with some embodiments of the present disclosure.

FIG. 8 is a graph showing the makespan and the execution cost comparison of mapping generated using simulation and its execution on actual cloud instances for the Digital Drawing application, in accordance with some embodiments of the present disclosure. In FIG. 8, the comparison is performed for non-optimized, intermediate, and optimal mappings corresponding to $1^{st}$, $100^{th}$, and $350^{th}$ iterations respectively for the Digital Drawing application. As shown in FIG. 8, for the Digital Drawing application, the optimal mapping of the workflow results in a 61% improvement in the makespan and 51% improvement in the execution cost of deployment as compared to the non-optimized mapping.

Figure 9:
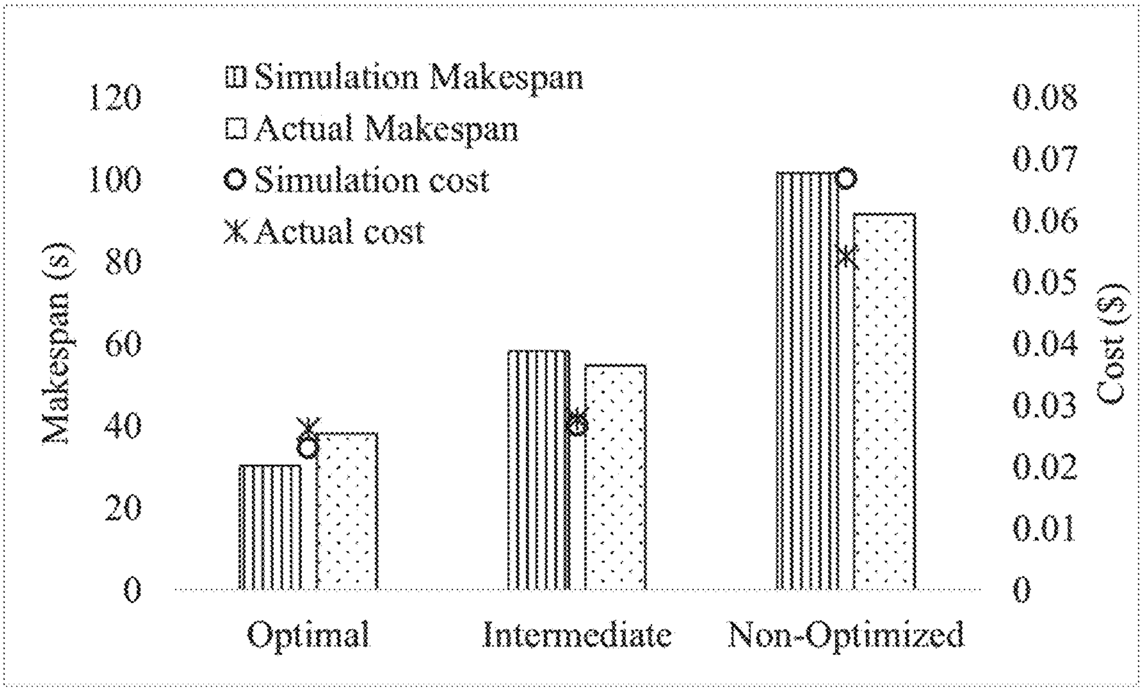
FIG. 9 is a graph showing the makespan and the execution cost comparison of mapping generated using simulation and its execution on actual cloud instances for the Deep Reader application, in accordance with some embodiments of the present disclosure.

FIG. 9 is a graph showing the makespan and the execution cost comparison of mapping generated using simulation and its execution on actual cloud instances for the Deep Reader application, in accordance with some embodiments of the present disclosure. In FIG. 9, the comparison is performed for non-optimized, intermediate, and optimal mappings corresponding to $1^{st}$, $100^{th}$, and $350^{th}$ iterations respectively for the Deep Reader application. As shown in FIG. 9, for the Deep Reader application, the optimal mapping of the workflow results in a 58% improvement in the makespan and 51% improvement in the execution cost of deployment as compared to the non-optimized mapping.

5. Based on the experimental analysis, two important conclusions are made as
   - Advanced PSO algorithm can successfully generate an optimal schedule for the workflow to cloud mapping that results in better performance and cost of deployment.
   - As shown in Table 3, generated optimal mapping consists of tasks mapped to a mix of serverless instances from different clouds proving that the multi-cloud deployments result in better performance and cost as compared to deployment in a single cloud.

The embodiments of present disclosure herein address unresolved problem of generating the multi-objective workflow scheduling to serverless architecture in the multi-cloud environment. The methods and systems of the present disclosure make use of the adaptive rate particle swarm optimization (PSO) algorithm for searching the optimal configuration of the serverless computing instances such as FaaS instances to deploy task workflows such as Al task workflows.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description.

Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms “a,” “an,” and “the” include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term “computer-readable medium” should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising the steps of:

receiving, via one or more hardware processors, a plurality of serverless computing instances and a plurality of storage services available in a plurality of cloud service providers of a multi-cloud serverless environment, wherein the plurality of serverless computing instances is of a heterogeneous configuration;

receiving, via the one or more hardware processors, a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure;

determining, via the one or more hardware processors, (i) one or more compute requirements, and (ii) one or more input/output (I/O) requirements required for each of the plurality of tasks present in the task workflow, based on the one or more dependencies among the plurality of tasks;

determining, via the one or more hardware processors, (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generating, via the one or more hardware processors, an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

2. The method of claim 1, wherein (i) the one or more compute requirements required for each task in the task workflow is determined based on a number of million instructions (MI) present in an associated task and associated one or more dependencies, and (ii) the one or more I/O requirements required for each task in the task workflow is determined based on a number of I/O operations, a file size of the associated task and the associated one or more dependencies.

3. The method of claim 1, wherein generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising:

(a) initializing each particle of the plurality of particles in an initial iteration, with random mappings using the PSO technique to obtain an initial position of each particle, wherein each particle in the random mappings represents a random mapping of each task of the plurality of tasks with the plurality of storage services and the plurality of serverless computing instances;

(b) calculating a value of the multi-objective optimization function for each particle, based on (i) the initial position of an associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the initial iteration;

(c) determining a local best of each particle, and a global best particle among the plurality of particles in the initial iteration, based on the value of the multi-objective optimization function for each particle;

(d) calculating one or more rate parameters of the plurality of particles in the initial iteration using an adaptive rate technique, wherein the one or more rate parameters are an inertia weight, a local learning rate and a global learning rate;

(e) moving each particle of the plurality of particles in a successive iteration, to obtain a next position of each particle, based on the initial position of each particle, the one or more rate parameters of the plurality of particles, the local best of each particle, and the global best particle among the plurality of particles in the initial iteration;

(f) calculating the value of the multi-objective optimization function for each particle, based on (i) the next position of the associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the successive iteration;

(g) determining the local best of each particle and the global best particle among the plurality of particles in the successive iteration, based on the value of the multi-objective optimization function for each particle in the successive iteration;

(h) calculating the one or more rate parameters of the plurality of particles in the successive iteration using the adaptive rate technique, wherein the one or more rate parameters are the inertia weight, the local learning rate and the global learning rate;

(i) repeating the steps (e) through (h) by considering the successive iteration as the initial iteration and the next position as the initial position, until one of (i) a predefined number of iterations are completed, and (ii) a global minimum of the multi-objective optimization function, is met, to obtain a final position of the global best particle; and (j) generating the optimal task workflow of the application for deployment in the multi-cloud serverless environment, based on the final position of the global best particle.

4. The method of claim 1, wherein generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising: perturbing each particle of the plurality of particles from an associated current position to the next position, if a change in the value of the multi-objective optimization function of the global best particle after a predefined number of iterations is less than a predefined threshold, and wherein a number of perturbations is less than a predefined perturbation threshold.

5. The method of claim 1, wherein the multi-objective optimization function is a weighted sum of a makespan and an execution cost of the task workflow of the application, wherein the makespan is defined as a total execution time of the task workflow, and the execution cost is defined as a total cost to execute the task workflow on the multi-cloud serverless environment based on a predefined cost model.

6. A system comprising:

a memory storing instructions;

one or more input/output (I/O) interfaces; and one or more hardware processors coupled to the memory via the one or more I/O interfaces, wherein the one or more hardware processors are configured by the instructions to:

receive a plurality of serverless computing instances and a plurality of storage services available in a plurality of cloud service providers of a multi-cloud serverless environment, wherein the plurality of serverless computing instances is of a heterogeneous configuration;

receive a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure;

determine (i) one or more compute requirements, and (ii) one or more input/output (I/O) requirements, required for each of the plurality of tasks present in the task workflow, based on the one or more dependencies among the plurality of tasks;

determine (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generate an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

7. The system of claim 6, wherein the one or more hardware processors are configured to determine: (i) the one or more compute requirements required for each task in the task workflow, based on a number of million instructions (MI) present in an associated task and associated one or more dependencies, and (ii) the one or more I/O requirements required for each task in the initial task workflow, based on a number of I/O operations, a file size of the associated task, and the associated one or more dependencies.

8. The system of claim 6, wherein the one or more hardware processors are configured to generate the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, by:

(a) initializing each particle of the plurality of particles in an initial iteration, with random mappings using the PSO technique to obtain an initial position of each particle, wherein each particle in the random mappings represents a random mapping of each task of the plurality of tasks with the plurality of storage services and the plurality of serverless computing instances;

(b) calculating a value of the multi-objective optimization function for each particle, based on (i) the initial position of an associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the initial iteration;

(c) determining a local best of each particle, and a global best particle among the plurality of particles in the initial iteration, based on the value of the multi-objective optimization function for each particle;

(d) calculating one or more rate parameters of the plurality of particles in the initial iteration using an adaptive rate technique, wherein the one or more rate parameters are an inertia weight, a local learning rate and a global learning rate;

(e) moving each particle of the plurality of particles in a successive iteration, to obtain a next position of each particle, based on the initial position of each particle, the one or more rate parameters of the plurality of particles, the local best of each particle, and the global best particle among the plurality of particles in the initial iteration;

(f) calculating the value of the multi-objective optimization function for each particle, based on (i) the next position of the associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the successive iteration;

(g) determining the local best of each particle and the global best particle among the plurality of particles in the successive iteration, based on the value of the multi-objective optimization function for each particle in the successive iteration;

(h) calculating the one or more rate parameters of the plurality of particles in the successive iteration using the adaptive rate technique, wherein the one or more rate parameters are the inertia weight, the local learning rate and the global learning rate;

(i) repeating the steps (e) through (h) by considering the successive iteration as the initial iteration and the next position as the initial position, until one of (i) a predefined number of iterations are completed, and (ii) a global minimum of the multi-objective optimization function, is met, to obtain a final position of the global best particle; and (j) generating the optimal task workflow of the application for deployment in the multi-cloud serverless environment, based on the final position of the global best particle.

9. The system of claim 6, wherein the one or more hardware processors are configured to generate the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, by: perturbing each particle of the plurality of particles from an associated current position to the next position, if a change in the value of the multi-objective optimization function of the global best particle after a predefined number of iterations is less than a predefined threshold, and wherein a number of perturbations is less than a predefined perturbation threshold.

10. The system of claim 6, wherein the multi-objective optimization function is a weighted sum of a makespan and an execution cost of the task workflow of the application, wherein the makespan is defined as a total execution time of the task workflow, and the execution cost is defined as a total cost to execute the task workflow on the multi-cloud serverless environment based on a predefined cost model.

11. One or more non-transitory machine-readable information storage mediums comprising one or more instructions which when executed by one or more hardware processors cause:

receiving a plurality of serverless computing instances and a plurality of storage services available in a plurality of cloud service providers of a multi-cloud serverless environment, wherein the plurality of serverless computing instances is of a heterogeneous configuration;

receiving a task workflow of an application to be executed in the multi-cloud serverless environment, wherein the task workflow comprises a plurality of tasks and one or more dependencies among the plurality of tasks, and wherein the task workflow is received in a directed acyclic graph (DAG) structure;

determining (i) one or more compute requirements, and (ii) one or more input/output (I/O) requirements required for each of the plurality of tasks present in the task workflow, based on the one or more dependencies among the plurality of tasks;

determining (i) a compute capacity of each of the plurality of serverless computing instances, based on a number of cores and a memory size defined in a configuration of an associated serverless computing instances, and (ii) bandwidth measurements between each of the plurality of storage services and each of the plurality of serverless computing instances, based on an I/O latency and one or more network overheads of the multi-cloud serverless environment, wherein the compute capacity is determined in terms of million instructions per second (MIPS); and generating an optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using a particle swarm optimization (PSO) technique and by minimizing a multi-objective optimization function, wherein the optimized task workflow comprises an optimal mapping of each task of the plurality of tasks with an associated serverless computing instance of the plurality of serverless computing instances, and an associated storage service of the plurality of storage services.

12. The one or more non-transitory machine-readable information storage mediums of claim 11, wherein (i) the one or more compute requirements required for each task in the task workflow is determined based on a number of million instructions (MI) present in an associated task and associated one or more dependencies, and (ii) the one or more I/O requirements required for each task in the task workflow is determined based on a number of I/O operations, a file size of the associated task and the associated one or more dependencies.

13. The one or more non-transitory machine-readable information storage mediums of claim 11, wherein generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising:

(a) initializing each particle of the plurality of particles in an initial iteration, with random mappings using the PSO technique to obtain an initial position of each particle, wherein each particle in the random mappings represents a random mapping of each task of the plurality of tasks with the plurality of storage services and the plurality of serverless computing instances;

(b) calculating a value of the multi-objective optimization function for each particle, based on (i) the initial position of an associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the initial iteration;

(c) determining a local best of each particle, and a global best particle among the plurality of particles in the initial iteration, based on the value of the multi-objective optimization function for each particle;

(d) calculating one or more rate parameters of the plurality of particles in the initial iteration using an adaptive rate technique, wherein the one or more rate parameters are an inertia weight, a local learning rate and a global learning rate;

(e) moving each particle of the plurality of particles in a successive iteration, to obtain a next position of each particle, based on the initial position of each particle, the one or more rate parameters of the plurality of particles, the local best of each particle, and the global best particle among the plurality of particles in the initial iteration;

(f) calculating the value of the multi-objective optimization function for each particle, based on (i) the next position of the associated particle, (ii) the one or more compute requirements and the one or more input/output (I/O) requirements required for each task present in the task workflow, (iii) the compute capacity of each of the plurality of serverless computing instances, and (iv) the bandwidth measurements between each of the plurality of storage services and each of the plurality of serverless computing instances, in the successive iteration;

(g) determining the local best of each particle and the global best particle among the plurality of particles in the successive iteration, based on the value of the multi-objective optimization function for each particle in the successive iteration;

(h) calculating the one or more rate parameters of the plurality of particles in the successive iteration using the adaptive rate technique, wherein the one or more rate parameters are the inertia weight, the local learning rate and the global learning rate;

(i) repeating the steps (e) through (h) by considering the successive iteration as the initial iteration and the next position as the initial position, until one of (i) a predefined number of iterations are completed, and (ii) a global minimum of the multi-objective optimization function, is met, to obtain a final position of the global best particle; and (j) generating the optimal task workflow of the application for deployment in the multi-cloud serverless environment, based on the final position of the global best particle.

14. The one or more non-transitory machine-readable information storage mediums of claim 11, wherein generating the optimized task workflow of the application for deployment in the multi-cloud serverless environment from the task workflow, based on (i) the one or more compute requirements and the one or more input/output (I/O) requirements required for each task present in the task workflow, (ii) the compute capacity of each of the plurality of serverless computing instances, and (iii) the bandwidth measurements between each of the plurality of storage services and each of the plurality of serverless computing instances, using the particle swarm optimization (PSO) technique with the multi-objective optimization function, comprising: perturbing each particle of the plurality of particles from an associated current position to the next position, if a change in the value of the multi-objective optimization function of the global best particle after a predefined number of iterations is less than a predefined threshold, and wherein a number of perturbations is less than a predefined perturbation threshold.

15. The one or more non-transitory machine-readable information storage mediums of claim 11, wherein the multi-objective optimization function is a weighted sum of a makespan and an execution cost of the task workflow of the application, wherein the makespan is defined as a total execution time of the task workflow, and the execution cost is defined as a total cost to execute the task workflow on the multi-cloud serverless environment based on a predefined cost model.

* * * * *